(12) United States Patent
Harwood et al.

(10) Patent No.: US 9,116,905 B1
(45) Date of Patent: Aug. 25, 2015

(54) SYSTEM AND METHOD FOR CATALOGING DATA

(75) Inventors: John S. Harwood, Paxton, MA (US); Kiran Madnani, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 497 days.

(21) Appl. No.: 12/894,763

(22) Filed: Sep. 30, 2010

Related U.S. Application Data

(63) Continuation-in-part of application No. 12/828,034, filed on Jun. 30, 2010, now Pat. No. 8,595,749.

(51) Int. Cl.
*G06F 17/30* (2006.01)
*G06F 11/34* (2006.01)

(52) U.S. Cl.
CPC ...... *G06F 17/30144* (2013.01); *G06F 11/3476* (2013.01)

(58) Field of Classification Search
CPC .................................................. G06F 17/30144
See application file for complete search history.

(56) References Cited

U.S. PATENT DOCUMENTS

| | | | |
|---|---|---|---|
| 6,021,436 A * | 2/2000 | Garrett | 709/224 |
| 6,466,951 B1 * | 10/2002 | Birkler et al. | 1/1 |
| 6,721,713 B1 * | 4/2004 | Guheen et al. | 705/1.1 |
| 6,985,901 B1 * | 1/2006 | Sachse et al. | 1/1 |
| 7,203,723 B2 | 4/2007 | Ogawa | |
| 7,283,045 B1 | 10/2007 | Manz | |
| 7,430,629 B2 | 9/2008 | Dunham et al. | |
| 7,540,027 B2 * | 5/2009 | Achanta et al. | 726/22 |
| 8,135,871 B2 | 3/2012 | Saitou et al. | |
| 8,234,462 B2 * | 7/2012 | Deetz et al. | 711/152 |
| 2005/0010683 A1 * | 1/2005 | Moleyar et al. | 709/238 |
| 2005/0052548 A1 | 3/2005 | Delaney | |
| 2006/0235831 A1 * | 10/2006 | Adinolfi et al. | 707/3 |
| 2007/0186068 A1 * | 8/2007 | Agrawal | 711/162 |
| 2007/0208762 A1 * | 9/2007 | Lunt et al. | 707/100 |
| 2008/0196043 A1 | 8/2008 | Feinleib et al. | |
| 2009/0043890 A1 | 2/2009 | Noonan, III | |
| 2009/0172044 A1 * | 7/2009 | Page et al. | 707/204 |
| 2010/0042867 A1 * | 2/2010 | Guven et al. | 714/2 |
| 2010/0076933 A1 * | 3/2010 | Hamilton et al. | 707/640 |
| 2010/0250497 A1 * | 9/2010 | Redlich et al. | 707/661 |
| 2011/0106768 A1 | 5/2011 | Khanzode et al. | |
| 2012/0089410 A1 * | 4/2012 | Mikurak | 705/1.1 |
| 2012/0089562 A1 * | 4/2012 | Deremigio et al. | 707/602 |

OTHER PUBLICATIONS

Free Online Dictionary of Computing, 2009, p. 1.*
Koopmann, Purging Oracle Database's Alert Log with ADRCI—Usage and Warning, Apr. 15, 2010, pp. 1-5.*
Jiang et al., Sustained Data Recording System Based on Disk Array, IEEE AES Systems Magazine. p. 31-34. Jun. 2, 2003.

* cited by examiner

*Primary Examiner* — Albert Phillips, III
(74) *Attorney, Agent, or Firm* — Brian J. Colandreo; Mark H. Whittenberger; Holland & Knight LLP

(57) ABSTRACT

A method, computer program product, and computing system for includes processing a log file to determine the location of one or more data files within a data environment. The log file indicates the occurrence of a data operation event within the data environment. A data operation is performed on at least a portion of the one or more data files located via the log file.

18 Claims, 2 Drawing Sheets

SYSTEM AND METHOD FOR CATALOGING DATA

RELATED APPLICATION(S)

This application is a Continuation-in-Part of and claims the priority of U.S. patent application Ser. No. 12/828,034, filed on 30 Jun. 2010, and entitled "System and Method for Cataloging Data", which is herein incorporated by reference in its entirety.

TECHNICAL FIELD

This disclosure relates to data organization and, more particularly, to systems and methods for cataloging data within a computing system.

BACKGROUND

There are a number of ways to protect data within an enterprise system, examples of which may include business continuation solutions and data recovery solutions. In order to meet with the demands of such systems, replica copies of data may be generated and e.g., stored at remote locations. In addition to maintaining such copies in a real-time fashion, older versions of data may be maintained for archival purposes.

Unfortunately, enterprise systems are continuously in a state of flux: old physical devices may be taken offline, new physical devices may be placed online, old software applications may be taken offline, and new software applications may be placed online. Unfortunately, such changes may result in data being orphaned, in that e.g., a data set is present on a system that was accessed by an application that has been removed from the system. Further, complicating the situation is that, being the application has been taken offline, the existence/utility of the data set is no longer readily apparent. Accordingly, the existence of such data sets may be essentially unknown.

SUMMARY OF DISCLOSURE

In a first implementation, a computer implemented method includes processing a log file to determine the location of one or more data files within a data environment. The log file indicates the occurrence of a data operation event within the data environment. A data operation is performed on at least a portion of the one or more data files located via the log file.

One or more of the following features may be included. Processing a log file may include machine processing the log file. Processing a log file may include manually processing the log file.

The data environment may include one or more storage arrays. The data operation event may occur within the one or more storage arrays.

Performing a data operation may include performing a secure erase procedure on at least a portion of the one or more data files located via the log file. Performing a data operation may include performing a performing a data migration procedure on at least a portion of the one or more data files located via the log file. Performing a data operation may include performing a security compliance procedure on at least a portion of the one or more data files located via the log file. Performing a data operation may include performing an efficiency enhancement procedure on at least a portion of the one or more data files located via the log file.

In another implementation of this disclosure, a computer program product resides on a computer readable medium and has a plurality of instructions stored on it. When executed by a processor, the instructions cause the processor to perform operations including processing a log file to determine the location of one or more data files within a data environment. The log file indicates the occurrence of a data operation event within the data environment. A data operation is performed on at least a portion of the one or more data files located via the log file.

One or more of the following features may be included. Processing a log file may include machine processing the log file. Processing a log file may include manually processing the log file.

The data environment may include one or more storage arrays. The data operation event may occur within the one or more storage arrays.

Performing a data operation may include performing a secure erase procedure on at least a portion of the one or more data files located via the log file. Performing a data operation may include performing a performing a data migration procedure on at least a portion of the one or more data files located via the log file. Performing a data operation may include performing a security compliance procedure on at least a portion of the one or more data files located via the log file. Performing a data operation may include performing an efficiency enhancement procedure on at least a portion of the one or more data files located via the log file.

In another implementation, a computing system includes at least one processor and at least one memory architecture coupled with the at least one processor. A first software module is executed on the at least one processor and the at least one memory architecture. The first software module is configured to perform operations including processing a log file to determine the location of one or more data files within a data environment. The log file indicates the occurrence of a data operation event within the data environment. A second software module is executed on the at least one processor and the at least one memory architecture. The second software module is configured to perform operations including performing a data operation on at least a portion of the one or more data files located via the log file.

One or more of the following features may be included. Processing a log file may include machine processing the log file. Processing a log file may include manually processing the log file.

The data environment may include one or more storage arrays. The data operation event may occur within the one or more storage arrays.

Performing a data operation may include performing a secure erase procedure on at least a portion of the one or more data files located via the log file. Performing a data operation may include performing a performing a data migration procedure on at least a portion of the one or more data files located via the log file. Performing a data operation may include performing a security compliance procedure on at least a portion of the one or more data files located via the log file. Performing a data operation may include performing an efficiency enhancement procedure on at least a portion of the one or more data files located via the log file.

The details of one or more implementations are set forth in the accompanying figures and the description below. Other features and advantages will become apparent from the description, the figures, and the claims.

BRIEF DESCRIPTION OF THE FIGURES

Like reference symbols in the various figures indicate like elements.

DETAILED DESCRIPTION OF THE PREFERRED EMBODIMENTS

Figure 1:
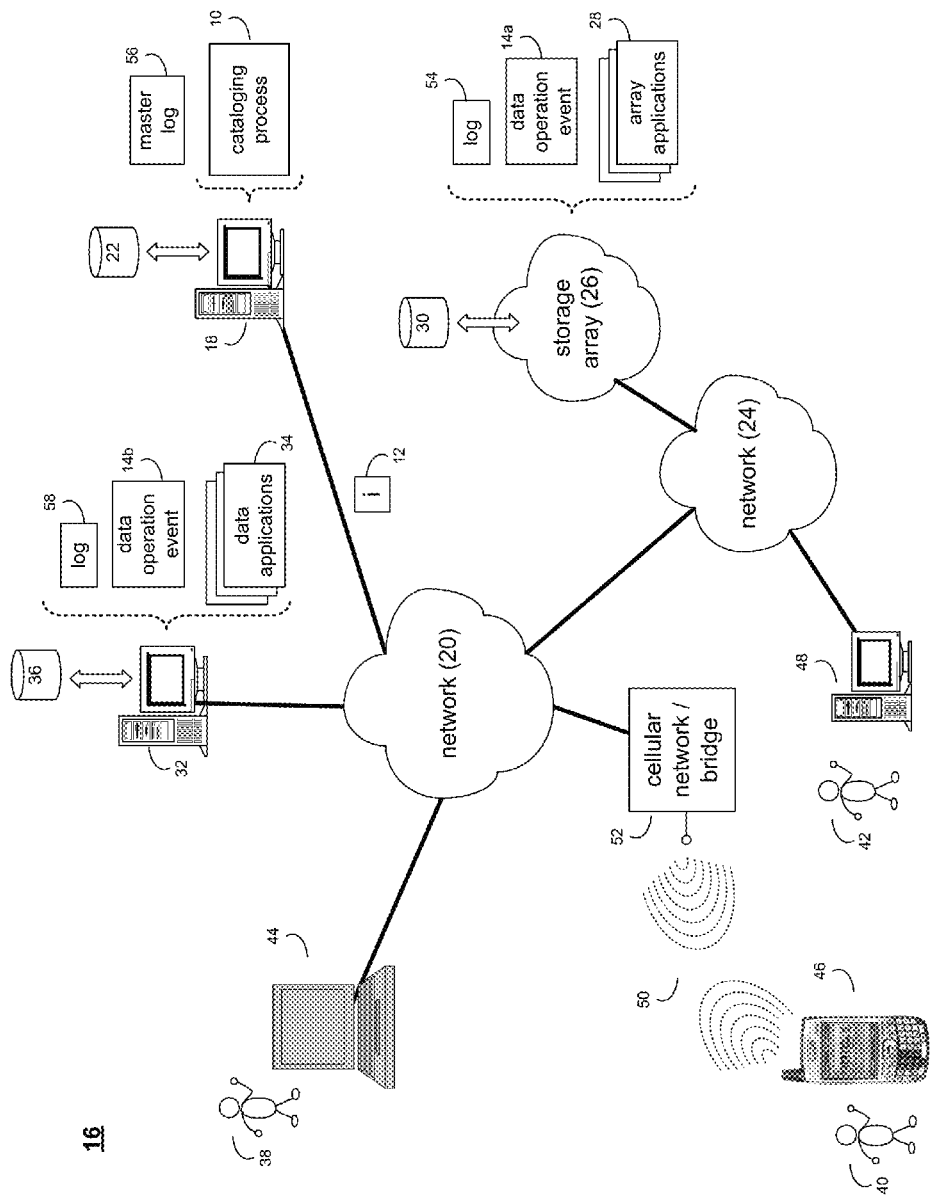
FIG. 1 is a diagrammatic view of a distributed computing network including a computing device that executes a cataloging process.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
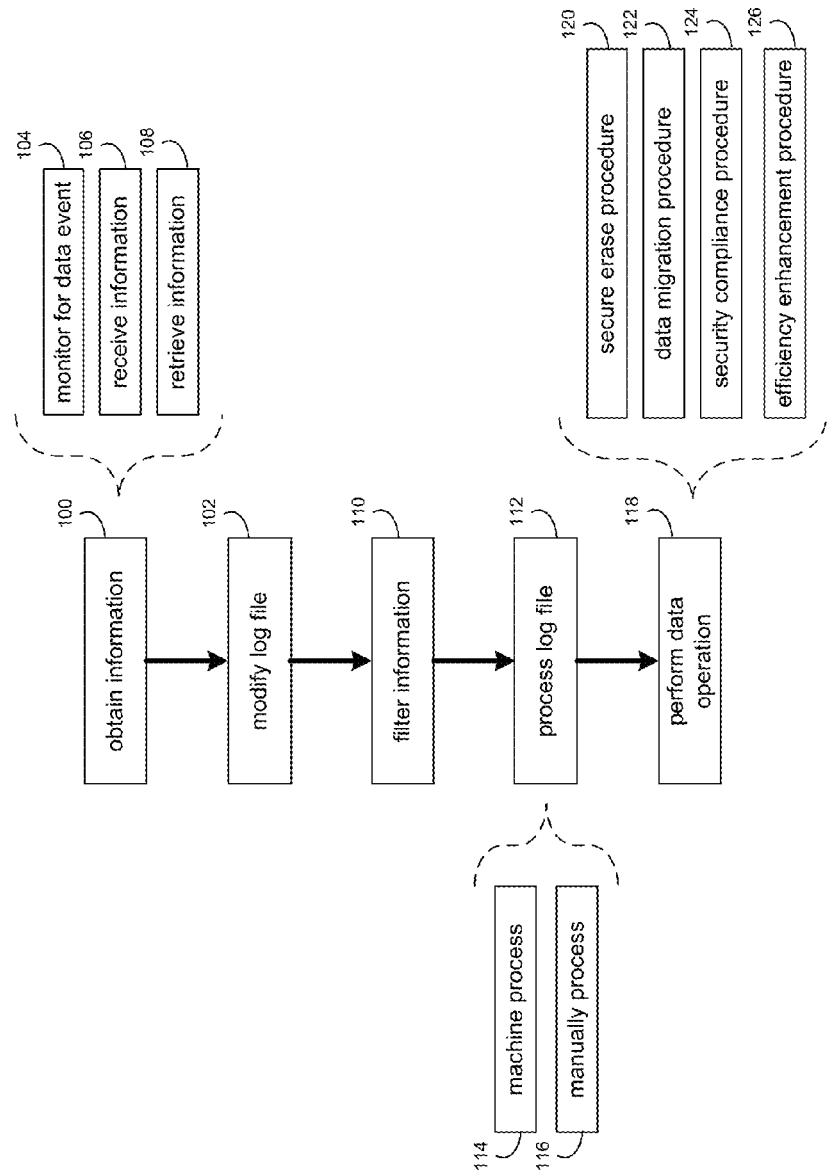
FIG. 2 is a flowchart of the cataloging process of FIG. 1.

System Overview:

Referring to FIGS. 1 & 2, there is shown cataloging process 10 that may obtain 100 information 12 concerning the possible occurrence of a data operation event (e.g., data operation event 14*a* and/or data operation event 14*b*) performed within a data environment (e.g., enterprise 16). In the event of such an occurrence, a log file may be modified 102 to indicate the occurrence of the data operation event (e.g., data operation event 14*a* and/or data operation event 14*b*) within the data environment (e.g., enterprise 16).

Cataloging process 10 may reside on and may be executed by server computer 18, which may be connected to network 20 (e.g., the Internet or a local area network). Examples of server computer 18 may include, but are not limited to: a personal computer, a server computer, a series of server computers, a mini computer, and a mainframe computer. Server computer 18 may execute a network operating system, examples of which may include but are not limited to: Microsoft Windows XP Server™; Novell Netware™; or Redhat Linux™, for example.

The instruction sets and subroutines of cataloging process 10, which may be stored on storage device 22 coupled to server computer 18, may be executed by one or more processors (not shown) and one or more memory architectures (not shown) incorporated into server computer 18. Storage device 22 may include but is not limited to: a hard disk drive; a tape drive; an optical drive; a RAID array; a random access memory (RAM); and a read-only memory (ROM).

Server computer 18 may execute a web server application, examples of which may include but are not limited to: Microsoft IIS™, Novell Webserver™, or Apache Webserver™, that allows for HTTP (i.e., HyperText Transfer Protocol) access to server computer 18 via network 20. Network 20 may be connected to one or more secondary networks (e.g., network 24), examples of which may include but are not limited to: a local area network; a wide area network; or an intranet, for example.

Storage array 26 may execute one or more array applications (e.g., array applications 28), examples of which may include but are not limited to: data replication applications, data backup applications, data encryption applications, business continuity applications, and disaster and recovery applications. Examples of storage array 26 may include but are not limited to network attached storage devices, storage area networks, local area networks, and wide area networks. The instruction sets and subroutines of array applications 28, which may be stored on storage device 30 coupled to storage array 26, may be executed by one or more processors (not shown) and one or more memory architectures (not shown) incorporated into storage array 26. Storage device 30 may include but is not limited to: a hard disk drive; a tape drive; an optical drive; a RAID array; a random access memory (RAM); and a read-only memory (ROM).

Server computer 32 may execute one or more data applications (e.g., data applications 34), examples of which may include but are not limited to: word processing applications, document management applications, spreadsheet applications, database applications, data backup applications, and email applications. The instruction sets and subroutines of data applications 34, which may be stored on storage device 36 coupled to server computer 32, may be executed by one or more processors (not shown) and one or more memory architectures (not shown) incorporated into server computer 32. Storage device 36 may include but is not limited to: a hard disk drive; a tape drive; an optical drive; a RAID array; a random access memory (RAM); and a read-only memory (ROM).

Examples of server computer 32 may include, but are not limited to: a personal computer, a server computer, a series of server computers, a mini computer, and a mainframe computer. Server computer 32 may execute a network operating system, examples of which may include but are not limited to: Microsoft Windows XP Server™; Novell Netware™; or Redhat Linux™, for example. Server computer 32 may execute a web server application, examples of which may include but are not limited to: Microsoft IIS™, Novell Webserver™, or Apache Webserver™, that allows for HTTP (i.e., HyperText Transfer Protocol) access to server computer 32 via network 20, 24.

Users 38, 40, 42 may access cataloging process 10, array applications 28 and/or data applications 34 directly through various devices, such as notebook computer 44, smart phone 46 and/or computing device 48. Notebook computer 44, smart phone 46 and/or computing device 48 may be directly or indirectly coupled to network 20 (or network 24). For example, notebook computer 44 is shown directly coupled to network 20 via a hardwired network connection. Further, computing device 48 is shown directly coupled to network 24 via a hardwired network connection. Smart phone 46 is shown wirelessly coupled to network 20 via wireless communication channel 50 established between smart phone 46 and cellular network/bridge 52, which is shown directly coupled to network 20. Additional devices (not shown) may be wirelessly coupled to network 20, 24 via a wireless communication channel (not shown) established between the device (not shown) and e.g., a wireless access point (not shown), which may be coupled to network 20, 24. The wireless access point (not shown) may be e.g., an IEEE 802.11a, 802.11b, 802.11g, Wi-Fi, and/or Bluetooth device that is capable of a establishing a wireless communication channel (not shown) between the device (not shown) and the wireless access point (not shown).

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Cataloging Process:

As discussed above cataloging process 10 may obtain 100 information 12 concerning the possible occurrence of a data operation event (e.g., data operation event 14a and/or data operation event 14b) performed within a data environment (e.g., enterprise 16). In the event of such an occurrence, a log file may be modified 102 to indicate the occurrence of the data operation event (e.g., data operation event 14a and/or data operation event 14b) within the data environment (e.g., data environment 16).

While the data environment is described above as being an enterprise, this is for illustrative purposes only and is not intended to be a limitation of this disclosure, as other configurations are possible and are considered to be within the scope of this disclosure. For example, the data environment may be a computing cloud.

As discussed above, the data environment (e.g., enterprise 16) may include one or more storage arrays (e.g., storage array 26) and the data operation event (e.g., data event 14a) may occur within the one or more data arrays. A data operation event may be generally defined as an event that results in the generation/modification of data. Examples of such data operation events may include but are not limited to: generating a new data file; modifying an existing data file; and copying an existing data file (as a replica or a backup).

Further and as discussed above, examples of array applications 28 may include but are not limited to: data replication applications (which may generate a replicated data file), data backup applications (which may generate a backup data file), data encryption applications (which may generate an encrypted data file), business continuity applications (which may generate a replica/backup data file), and disaster and recovery applications (which may generate a replica/backup data files).

When array applications 28 perform one of the above-described data operation events, array applications 28 may write to a log file (e.g., array log file 54) defining the type of data operation event performed (e.g., copy of file XYZ was made within storage array 26, new file ABC was generated within storage array 26, etc.). Additionally, array applications 28 may be configured to write additional data to array log file 54. For example, diagnostic data concerning storage array 26/array applications 28 may be written to array log file 54, startup/shutdown events concerning storage array 26/array applications 28 may be written to array log file 54, etc.

As discussed above, cataloging process 10 may obtain 100 information 12 concerning the possible occurrence of these data operation events (e.g., data event 14a) performed within e.g., storage array 26. In the event of such an occurrence, a master log file (e.g., master log file 56) may be modified 102 to indicate the occurrence of the data operation event (e.g., data event 14a) within the data environment (e.g., data environment 16).

When obtaining 100 information concerning the possible occurrence of a data operation event, cataloging process 10 may monitor 104 for the possible occurrence of the data operation event performed within e.g., storage array 26. For example, array applications 28 may be configured to push a complete copy of array log file 54 to cataloging process 10. Alternatively, array applications 28 may be configured to push a differential copy of array log file 54 to cataloging process 10. Upon receiving 106 this complete/differential copy of array log file 54, cataloging process 10 may subsequently process the same (to be discussed below)

Further, cataloging process 10 may be configured to retrieve a complete copy of array log file 54 from array applications 28. Alternatively, cataloging process 10 may be configured to retrieve a differential copy of array log file 54 from array applications 28. Upon retrieving 108 this complete/differential copy of array log file 54, cataloging process 10 may subsequently process the same (to be discussed below)

As discussed above, the data environment (e.g., enterprise 16) may include one or more data applications (e.g., data applications 34) and the data operation event (e.g., data event 14b) may occur within data applications 34. As stated above, a data operation event may be generally defined as an event that results in the generation/modification of data. Examples of such data operation events may include but are not limited to: generating a new data file; modifying an existing data file; and copying an existing data file (as a replica or a backup).

Further and as discussed above, examples of data applications 28 may include but are not limited to: word processing applications (which may generate a word processor data file), document management applications (which may generate a document data file), spreadsheet applications (which may generate a spreadsheet data file), database applications (which may generate a database data file), data backup applications (which may generate a backup data file), and email applications (which may generate an email attachment data file).

When data applications 34 perform one of the above-described data operation events, data applications 34 may write to a log file (e.g., data log file 58) defining the type of data operation event performed (e.g., copy of file XYZ was made by data applications 34, new file ABC was generated by data applications 34, etc.). Additionally, data applications 34 may be configured to write additional data to data log file 58. For example, diagnostic data concerning data applications 34 may be written to data log file 58, startup/shutdown events concerning data applications 34 may be written to data log file 58, etc.

As discussed above, cataloging process 10 may obtain 100 information 12 concerning the possible occurrence of these data operation event (e.g., data event 14b) performed within e.g., data applications 34. In the event of such an occurrence, a master log file (e.g., master log file 56) may be modified 102 to indicate the occurrence of the data operation event (e.g., data event 14b) within the data environment (e.g., data environment 16).

When obtaining 100 information 12 concerning the possible occurrence of a data operation event, cataloging process 10 may monitor 104 for the possible occurrence of the data operation event performed within e.g., data applications 34. For example, data applications 34 may be configured to push a complete copy of data log file 58 to cataloging process 10. Alternatively, data applications 34 may be configured to push a differential copy of data log file 58 to cataloging process 10. Upon receiving 106 this complete/differential copy of data log file 58, cataloging process 10 may subsequently process the same (to be discussed below)

Further, cataloging process 10 may be configured to retrieve a complete copy of data log file 58 from data applications 34 for subsequent processing (to be discussed below). Alternatively, cataloging process 10 may be configured to retrieve a differential copy of data log file 58 from data applications 34 for subsequent processing (to be discussed below). Upon retrieving 108 this complete/differential copy of data log file 58, cataloging process 10 may subsequently process the same (to be discussed below)

As discussed above, upon receiving 106/retrieving 108 the complete/differential copy of array log file 54 and/or data log file 58 (e.g., information 12), cataloging process 10 may subsequently process the same. Accordingly, cataloging process 10 may filter 110 the information obtained concerning the possible occurrence of the data operation event (e.g., the complete/differential copy of array log file 54 and/or data log file 58) to extract data location information.

For example, in the event that a complete copy of the log file (e.g., array log file 54 and/or data log file 58) is received 106/retrieved 108, data cataloging process 10 may filter 110 the complete copy of array log file 54 and/or data log file 58 to remove entries that were previously processed. For example, if the complete copy of the log file (e.g., array log file 54 and/or data log file 58) is received 106/retrieved 108 on a daily basis, cataloging process 10 may filter the same to remove all entries from previous days.

Further and for example, data cataloging process 10 may filter 110 the copy of array log file 54 and/or data log file 58 (received 106/retrieved 108 as information 12) to remove entries that do not concern data operation events (i.e., events that result in the generation/modification of data) and provide data location information.

Examples of such data operation events may include but are not limited to: generating a new data file; modifying an existing data file; and copying an existing data file (as a replica or a backup). Examples of the entries that may be removed may include but are not limited to: diagnostic data entries concerning data applications 34, startup/shutdown events concerning data applications 34, diagnostic data entries concerning storage array 26/array applications 28, startup/shutdown events concerning storage array 26/array applications 28, etc.

Once information 12 is filtered 110, data cataloging process 10 may write this filtered information to master log file 56. Accordingly, master log file 56 only contains entries that define data operation events (i.e., events that result in the generation/modification of data). Accordingly the location of all data generated/modified within data environment (e.g., enterprise 16) may be determined via master log file 56. For example, master log file 56 may be manually processed by e.g., an administrator so that the location of the pertinent data files could be determined within an enterprise. This information may then be used to e.g., effectuate a secure erase procedure, adhere to various privacy laws, perform a data audit, etc. Additionally/alternatively, master log file 56 may be machine processed to determine the location of the pertinent data files and then an automated procedure may be implemented to e.g., effectuate a secure erase procedure, adhere to various privacy laws, perform a data audit, etc.

As discussed above, the location of all data generated/modified within data environment (e.g., enterprise 16) may be determined via master log file 56. Cataloging process 10 may process 112 master log file 56 to determine the location of one or more data files within a data environment (e.g., enterprise 16). As discussed above, master log file 56 may indicate the occurrence of a data operation event within the data environment (e.g., enterprise 16).

The processing 112 of master log file 56 by cataloging process 10 may include machine processing 114 master log file 56, manually processing 116 master log file 56, or a combination of machine processing 114 and manually processing 116 master log file 56. For example, cataloging process 10 may process 200 each entry within master log file 56 automatically to determine the location of the data files within the data environment. Alternatively, cataloging process 10 may allow a user to manually review master log file 56 to determine the location of the data files within the data environment. Additionally/alternatively, cataloging process 200 may be configured to process 200 master log file 56 in a hybrid fashion, in which master log file 56 is partially machine processed and partially manually processed to determine the location of the data files within the data environment.

Cataloging process 10 may be further configured to perform 118 a data operation on at least a portion of the data files located via master log file 56. Examples of such data operations may include but are not limited to; performing 120 a secure erase procedure; performing 122 a data migration procedure; performing 124 a security compliance procedure; and performing 126 an efficiency enhancement procedure.

As discussed above, while the data environment is described above as being an enterprise, this is for illustrative purposes only and is not intended to be a limitation of this disclosure, as other configurations are possible and are considered to be within the scope of this disclosure. For example, the data environment may be a computing cloud.

Further and as discussed above, the data environment (e.g., enterprise 16) may include one or more storage arrays (e.g., storage array 26) and the data operation event (e.g., data event 14a) may occur within the one or more data arrays. A data operation event may be generally defined as an event that results in the generation/modification of data. Examples of such data operation events may include but are not limited to: generating a new data file; modifying an existing data file; and copying an existing data file (as a replica or a backup).

As discussed above, performing 118 a data operation may include performing 120 a secure erase procedure on at least a portion of the one or more data files located via master log file 56.

An example of such a secure erase procedure may include but is not limited to the following scenario. As discussed above, cataloging process 10 may process 112 master log file 56 to determine the location of one or more data files within e.g., enterprise 16. Once the data files that are to be the subject of the secure erase procedure are located, the secure erase procedure may be effectuated on such located files.

For example, once the appropriate data files are located, these data files may be securely erased by e.g., writing a sequence of generic data files over the data file(s) to be securely erased to ensure that the files are physically unrecoverable from the storage device, as opposed to only being marked for overwriting within the file allocation table of the storage device.

As discussed above, performing 118 a data operation may include performing 122 a data migration procedure on at least a portion of the one or more data files located via master log file 56.

An example of such a data migration procedure may include but is not limited to the following scenario. As discussed above, cataloging process 10 may process 112 master log file 56 to determine the location of one or more data files within e.g., enterprise 16. Once the data files that are to be the subject of the data migration procedure are located, the data migration procedure may be effectuated on such located files.

For example, once the appropriate data files are located, these data files may be migrated from the storage device on which they currently reside to an intended target storage device. Once these files are migrated, the versions of the data file(s) at the original data location may be surely erased (as discussed above).

As discussed above, performing 118 a data operation may include performing 124 a security compliance procedure on at least a portion of the one or more data files located via master log file 56.

An example of such a security compliance procedure may include but is not limited to the following scenario. As discussed above, cataloging process 10 may process 112 master log file 56 to determine the location of one or more data files within e.g., enterprise 16. Once the data files that are to be the subject of the security compliance procedure are located, the security compliance procedure may be effectuated on such located files.

For example, once the appropriate data files are located, these data files may be examined to make sure that they comply with certain security requirements/guidelines. Specifically, each data file that is located may be examined to ensure that these files adhere with e.g., data file storage location requirements, data file redundancy requirements, data file availability requirements, data file encryption requirements, data file routing/transmission requirements, data file naming requirements, data file size requirements, and data file format requirements.

As discussed above, performing 118 a data operation may include performing 126 an efficiency enhancement procedure on at least a portion of the one or more data files located via master log file 56.

An example of such an efficiency enhancement procedure may include but is not limited to the following scenario. As discussed above, cataloging process 10 may process 112 master log file 56 to determine the location of one or more data files within e.g., enterprise 16. Once the data files that are to be the subject of the efficiency enhancement procedure are located, the efficiency enhancement procedure may be effectuated on such located files.

For example, once the appropriate data files are located, these files may be processed to enhance efficiency. Specifically, the data file located may be examined to e.g., minimize/reduce the size of the data file(s), eliminate redundant data file(s), cluster related data file(s) within a common storage area, delete non-relevant data file(s) e.g., old backup data sets, and reformat the data file(s) into a more efficient format.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer implemented method comprising:
   filtering at least one of an array log file and a data log file to determine the occurrence of a data operation event within a data environment, wherein the data operation event includes at least one of generation and modification of data;
   writing information from the filtered at least one of the array log file and the data log file to a master log file;
   processing the master log file to determine the location of one or more data files within the data environment, wherein the master log file indicates the occurrence of the data operation event within the data environment, wherein processing includes manual processing and machine processing; and
   performing a data operation on at least a portion of the one or more data files located via the master log file, wherein performing the data operation includes performing an efficiency enhancement procedure on at least a portion of the one or more data files located via the master log file, wherein the efficiency enhancement procedure comprises at least one of reducing the size of at least a portion of the data files, eliminating redundant data files, clustering related data files within a common storage area, and deleting non-relevant data files; and wherein filtering the at least one of the array log file and the data log file includes filtering the at least one of the array log file and the data log file to remove entries from the at least one of the array log file and the data log file that were previously processed and entries that are not associated with the occurrence of the data operation event.

2. The computer implemented method of claim 1 wherein the data environment includes one or more storage arrays.

3. The computer implemented method of claim 2 wherein the data operation event occurs within the one or more storage arrays.

4. The computer implemented method of claim 1 wherein performing the data operation includes performing a secure erase procedure on at least a portion of the one or more data files located via the master log file.

5. The computer implemented method of claim 1 wherein performing the data operation includes performing a data migration procedure on at least a portion of the one or more data files located via the master log file.

6. The computer implemented method of claim 1 wherein performing the data operation includes performing a security compliance procedure on at least a portion of the one or more data files located via the master log file.

7. A computer program product residing on a non-transitory computer readable medium having a plurality of instructions stored thereon that, when executed by a processor, cause the processor to perform operations comprising:
   filtering at least one of an array log file and a data log file to determine the occurrence of a data operation event within a data environment, wherein the data operation event includes at least one of generation and modification of data;
   writing information from the filtered at least one of the array log file and the data log file to a master log file;
   processing the master log file to determine the location of one or more data files within the data environment, wherein the master log file indicates the occurrence of the data operation event within the data environment, wherein processing includes manual processing and machine processing; and
   performing a data operation on at least a portion of the one or more data files located via the master log file, wherein performing the data operation includes performing an efficiency enhancement procedure on at least a portion of the one or more data files located via the master log file, wherein the efficiency enhancement procedure comprises at least one of reducing the size of at least a portion of the data files, eliminating redundant data files, clustering related data files within a common storage area, and deleting non-relevant data files; and wherein filtering the at least one of the array log file and the data log file includes filtering the at least one of the array log file and the data log file to remove entries from the at least one of the array log file and the data log file that were previously processed and entries that are not associated with the occurrence of the data operation event.

8. The computer program product of claim 7 wherein the data environment includes one or more storage arrays.

9. The computer program product of claim 8 wherein the data operation event occurs within the one or more storage arrays.

10. The computer program product of claim 7 wherein performing the data operation includes performing a secure erase procedure on at least a portion of the one or more data files located via the master log file.

11. The computer program product of claim 7 wherein performing the data operation includes performing a data migration procedure on at least a portion of the one or more data files located via the master log file.

12. The computer program product of claim 7 wherein performing the data operation includes performing a security compliance procedure on at least a portion of the one or more data files located via the master log file.

13. A computing system comprising:
   at least one processor;
   at least one memory architecture coupled with the at least one processor;
   a first module executed on the at least one processor and the at least one memory architecture, wherein the third software module is configured to perform operations including filtering at least one of an array log file and a data log file to determine the occurrence of a data operation event within a data environment, wherein the data operation event includes at least one of generation and modification of data;
   a second module executed on the at least one processor and the at least one memory architecture, wherein the second software module is configured to perform operations including writing information from the filtered at least one of the array log file and the data log file to a master log file;
   a third module executed on the at least one processor and the at least one memory architecture, wherein the third software module is configured to perform operations including processing the master log file to determine the location of one or more data files within the data environment, wherein the master log file indicates the occurrence of the data operation event within the data environment, wherein processing includes manual processing and machine processing; and
   a fourth module executed on the at least one processor and the at least one memory architecture, wherein the fourth software module is configured to perform operations including performing a data operation on at least a portion of the one or more data files located via the master log file, wherein performing the data operation includes performing an efficiency enhancement procedure on at least a portion of the one or more data files located via the master log file, wherein the efficiency enhancement procedure comprises at least one of reducing the size of at least a portion of the data files, eliminating redundant data files, clustering related data files within a common storage area, and deleting non-relevant data files; and wherein filtering the at least one of the array log file and the data log file includes filtering the at least one of the array log file and the data log file to remove entries from the at least one of the array log file and the data log file that were previously processed and entries that are not associated with the occurrence of the data operation event.

14. The computer system of claim 13 wherein the data environment includes one or more storage arrays.

15. The computer system of claim 14 wherein the data operation event occurs within the one or more storage arrays.

16. The computer system of claim 13 wherein performing the data operation includes performing a secure erase procedure on at least a portion of the one or more data files located via the master log file.

17. The computer system of claim 13 wherein performing the data operation includes performing a data migration procedure on at least a portion of the one or more data files located via the master log file.

18. The computer system of claim 13 wherein performing the data operation includes performing a security compliance procedure on at least a portion of the one or more data files located via the master log file.

* * * * *